United States Patent

Koshikawa

[11] 4,321,682
[45] Mar. 23, 1982

[54] METHOD OF AND SYSTEM FOR TRACING MONOCHROMATICALLY CONTRASTING PATTERN

[75] Inventor: Yukio Koshikawa, Komae, Japan

[73] Assignee: Mitsuaki Senbokuya, Kokubunji, Japan

[21] Appl. No.: 135,851

[22] Filed: Mar. 28, 1980

[30] Foreign Application Priority Data

Mar. 30, 1979 [JP] Japan .............................. 54-038008

[51] Int. Cl.³ .......................... G06F 15/20; G05B 1/00
[52] U.S. Cl. ........................... 364/520; 340/146.3 AE; 356/376; 250/202
[58] Field of Search ...................... 364/520, 525, 526; 250/202, 208; 356/2, 376, 377; 340/146.3 AE

[56] References Cited

U.S. PATENT DOCUMENTS

| | | | |
|---|---|---|---|
| 3,423,589 | 1/1969 | Bardwell et al. | 250/202 |
| 3,671,937 | 6/1972 | Takahashi et al. | 250/202 X |
| 4,059,787 | 11/1977 | Aimar et al. | 250/202 X |
| 4,160,199 | 7/1979 | Bardwell | 250/202 X |

Primary Examiner—Jerry Smith
Attorney, Agent, or Firm—Martin Smolowitz

[57] ABSTRACT

A method of and a system for tracing a monochromatically contrasting pattern on a uniplanar surface, in which signals indicative of a detected image of the pattern are produced by photoelectric transducer elements arranged in a two-dimensional or linear matrix array and signals indicative of a suitable number of modified reference areas displaced a predetermined distance from a prescribed basic reference area formed on a plane parallel with the uniplanar surface are produced from memory units having the modified reference areas registered therein, whereupon signals indicative of areas over which the detected image sensing zone is overlapped by the modified reference areas are produced to determine the direction in which the matrix array is to be moved with respect to the pattern on the uniplanar surface.

24 Claims, 10 Drawing Figures

METHOD OF AND SYSTEM FOR TRACING MONOCHROMATICALLY CONTRASTING PATTERN

FIELD OF THE INVENTION

The present invention relates to a method of and a system for tracing a monochromatically contrasting geometrical or graphic pattern on a uniplanar surface such as a sheet of drawing carrying a linear or curvilinear line.

BACKGROUND OF THE INVENTION

An example of prior-art pattern tracing systems of the nature above mentioned is disclosed in U.S. Pat. No. 3,423,589 showing a photoelectric pattern-contour tracing system in which a sensing head having two discrete photocells is rotatable about its center axis and is movable over and along the pattern contour to be traced. The sensing head is positioned with respect to the pattern contour in such a manner that the two photocells are spaced apart in a direction perpendicular in nonintersecting relationship to the pattern contour. When the sensing head assumes a position having the photocells located symmetrically with respect to the width of the pattern contour, viz., when the center line of the spacing between the photocells is located accurately above the longitudinal center line of the pattern contour, the photocells are subjected to light of equal intensities so that the currents respectively produced by the photocells are equal in magnitude to each other. When the sensing head is deviated from the correct position over the pattern contour, the two photocells sense light of different intensities and thus produce currents with different magnitudes. The path along which the sensing head is to travel is adjusted upon detection of such a difference between the magnitudes of the currents respectively produced by the two photocells.

Since the adjustment of the path along which the sensing head is to advance is thus made through detection of the currents actually produced by the photocells moved with the sensing head, the sensing head must be moved and turned in various directions before a correct path is determined. For this reason, the sensing head must be equipped or associated with a disproportionately large number of mechanical members and structures which are subject to erroneous motion and failure during operation and which will add to the measurements, weight and production and maintenance costs of the tracing system as a whole. Because, furthermore, of the fact that the sensing head essentially consists of only two photocells which are juxtaposed in close proximity to each other and which are to be moved along the pattern to be traced, the sensing head can not be satisfactorily sensitive to acute angles and to lines extending in close proximity to each other.

Another example of known pattern tracing systems is taught in Japanese patent Publication No. 49-42803 showing a photoelectric pattern tracing system using a two-dimensional matrix array consisting of a number of photoelectric transducer elements arranged on xy-coordinates. The matrix array is positioned over the pattern to be traced and produces binary signals from those transducer elements which are located above a portion of the pattern. When the matrix array assumes a certain position over the portion of the pattern, one of the transducer elements produces binary signals indicating the location of a specific point of the portion of the pattern in terms of the xy-coordinates of the matrix array and another one of the transducer element produces binary signals indicative of the location of the leading end of the portion of the pattern in terms of the xy-coordinates. The matrix array is thus moved from the position indicated by the binary signals proudced by the former transducer element to the position indicated by the binary signals produced by the latter transducer element. Only the direction in which the portion of the pattern to be traced is detected by the matrix array, which is therefore not responsive to the width of the pattern and which is accordingly not capable of recognizing acute angles and lines which are close to each other.

The present invention contemplates elimination of these and other drawbacks inherent in prior-art pattern tracing systems of the described general natures.

SUMMARY OF THE INVENTION

In accordance with one outstanding aspect of the present invention, there is provided a method of tracing a monochromatically contrasting pattern on a uniplanar surface, comprising photoelectrically scanning at least a portion of the pattern of the uniplanar surface for producing signals forming on a plane substantially parallel with the uniplanar surface a detected image sensing zone substantially similar in configuration to the portion of the pattern on the uniplanar surface, registering pieces of information representative of a predetermined number of modified reference areas each displaced a predetermined distance in a predetermined direction from a prescribed basic area on the aforesaid plane, sampling the pieces of information for delivering signals representative of each of the individual modified reference areas, producing in responsive to the signals representative of the detected image sensing zone and the signals representative of each of the modified reference areas a signal representative of the overlap area over which the detected image sensing zone is overlapped by each of the modified reference area, selecting from among the individual signals respectively representative of the overlap areas between the detected image sensing zone and the modified reference areas a signal representative of an overlap area satisfying predetermined conditions, producing a control signal representative of the predetermined direction allocated to the modified reference area corresponding the signal selected, and photoelectrically scanning another portion of the pattern on the uniplanar surface depending upon the control signal.

In accordance with another outstanding aspect of the present invention, there is provided a photoelectric pattern tracing system for tracing a monochromatically contrasting pattern on a uniplanar surface, comprising an image sensing unit which is movable on a plane substantially parallel with the uniplanar surface and which is photoelectrically responsive to the pattern on the uniplanar surface, a predetermined number of memory units each having stored therein pieces of information representative of a modified reference area displaced a predetermined distance in a predetermined direction from a prescribed basic reference area on the aforesaid plane, image readout means operative to electrically scan the image sensing unit for causing the image sensing unit to deliver signals in response to at least a portion of the pattern, the signals forming on the above mentioned plane a detected image sensing zone substantially similar in configuration to the aforesaid portion of the pattern, memory readout means operative to sample the pieces of information stored in each of the memory units for causing the individual memory units to deliver signals representative of the modified reference areas respectively allocated to the memory units, an overlap area monitor circuit responsive to the signals delivered from the image sensing unit and the memory units and operative to produce a signal representative of the overlap area over which the basic reference area represented by the signals delivered from the image sensing unit is overlapped by the modified reference area represented by the signals delivered from each of the memory units, computing means responsive to the signal from the overlap area monitor circuit and operative to select from among the signals produced by the overlap area monitor circuit a signal representative of an overlap area satisfying predetermined conditions and to produce an output signal representative of the predetermined direction allocated to the memory unit from which the signals resulting in the signal selected by the computing means are delivered, and drive means responsive to the output signal from the computing means and operative to drive the image sensing unit to move a predetermined distance on the aforesaid plane in the direction represented by the output signal from the computing means.

In accordance with still another outstanding aspect of the present invention, there is provided a combination of the new photoelectric pattern tracing system and a machine tool such as an oxyacetylene torch.

BRIEF DESCRIPTION OF THE DRAWINGS

The features and advantages of a photoelectric pattern tracing system according to the present invention will be more clearly appreciated from the following description taken in conjunction with the accompanying drawings, in which.

DETAILED DESCRIPTION OF THE PREFERRED EMBODIMENTS

A first preferred embodiment of the photoelectric pattern tracing system according to the present invention will be hereinafter described in detail with reference to the accompanying drawings, particularly FIGS. 1 to 6 thereof.

Figure 1:
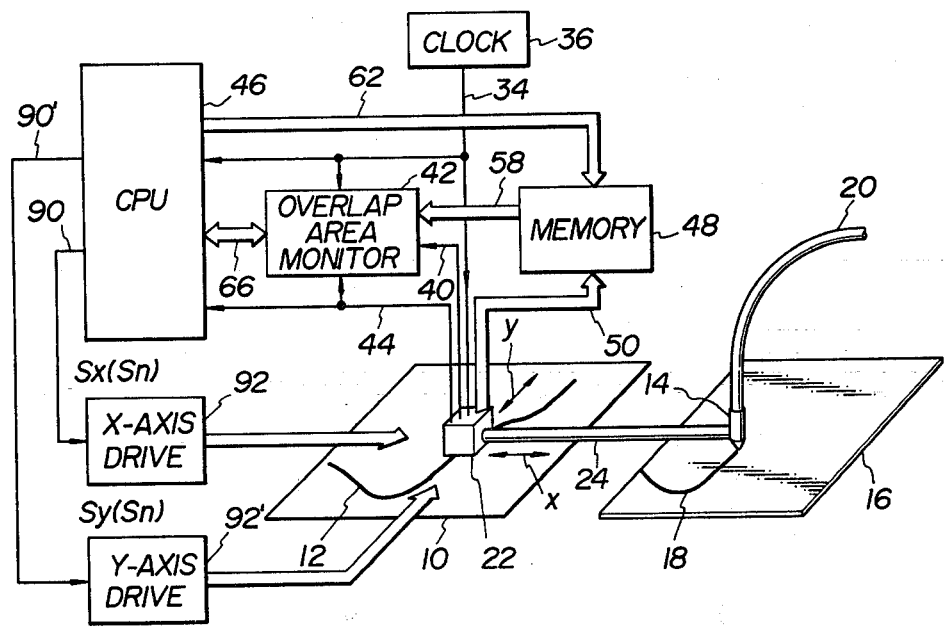
FIG. 1 is a schematic perspective view showing, largely in a block diagram, a preferred embodiment of the pattern tracing system according to the present invention.

Referring first to FIG. 1 of the drawings, the photoelectric pattern tracing system according to the present invention is used for the purpose of tracing a monochromatically contrasting geometric or graphical pattern carried on a uniplanar surface of a suitable recording medium which is shown, by way of example, to be in the form of a sheet of drawing 10 carrying a dark, curvilinear pattern 12 on its bright front face. In FIG. 1, furthermore, the photoelectric pattern tracing system proposed by the present invention is assumed, by way of example, to be used in combination with an oxyacetylene cutting torch 14 for making in a ferrous or wrought-iron sheet 16 a curvilinear cut 18 which is identical in configuration with the curvilinear pattern 12 on the drawing 10. The cutting torch 14 is coupled to a gas hose 20 leading from a suitable supply source (not shown) of oxyacetylene gas under pressure. If desired, the single cutting torch 14 as shown may be substituted by a set of oxyacetylene cutting torches arranged in parallel with one another on a common torch carrier (not shown).

In FIG. 1, the photoelectric pattern tracing system embodying the present invention is shown comprising a photoelectric image sensing unit 22 which is movable in two directions perpendicular to each other on a common plane parallel with the front face of the drawing 10. In the arrangement herein shown, the drawing 10 is assumed to be positioned on a horizontal plane with its front face directed upwardly so that the photoelectric image sensing unit 22 is movable over the front face of the drawing 20 in two horizontal directions perpendicular to each other as indicated by arrows x and y. The cutting torch 14 or the above mentioned common torch carrier having a plurality of cutting torches supported thereon is mechanically connected to the sensing unit 22 by means of a suitable coupling mechanism which is shown including a single connecting bar 24 connected at one end to the sensing unit 22 and at the other to the cutting torch 14. The cutting torch 14 or the common torch carrier is, thus, also movable in two horizontal directions perpendicular to each other over the front or upper face of the workpiece 16 which is also assumed to be positioned horizontally.

Figure 2:
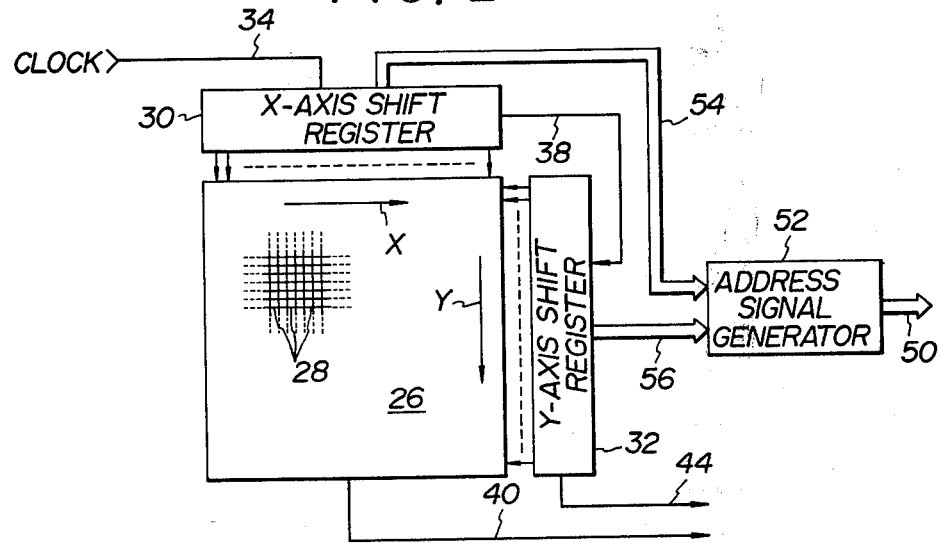
FIG. 2 is a schematic plan view showing, partly in a block diagram, the image sensing unit and the image and memory readout means forming part of the embodiment shown in FIG. 1.

Turning to FIG. 2 of the drawings, the photoelectric image sensing unit 22 comprises a two-dimensional image sensing matrix array 26 consisting of a predetermined number of separate and discrete photoelectric transducer elements 28 which are arranged in predetermined numbers of rows and columns on a common plane parallel with the plane on which the sensing unit 22 is movable. The image sensing matrix array 26 is electrically connected to first and second or X-axis and Y-axis shift registers 30 and 32 which constitute image readout means in the tracing system according to the present invention. The X-axis shift register 30 is adapted to sequentially sample the individual photoelectric transducer elements of each row at a predetermined frequency in response to a series of actuating signals successively supplied to the shift register 30. On the other hand, the Y-axis shift register 32 is adapted to sequentially select the rows of the transducer elements 28 in response to actuating signals supplied in succession from the X-axis shift register 30 upon completion of the sampling of the individual rows of the transducer elements 28 by the X-axis shift register 30. Each of the X-axis and Y-axis shift registers 30 and 32 to achieve these functions may be constituted by an ordinary digital shift register using, for example, a series of set-reset flipflops.

Figure 3:
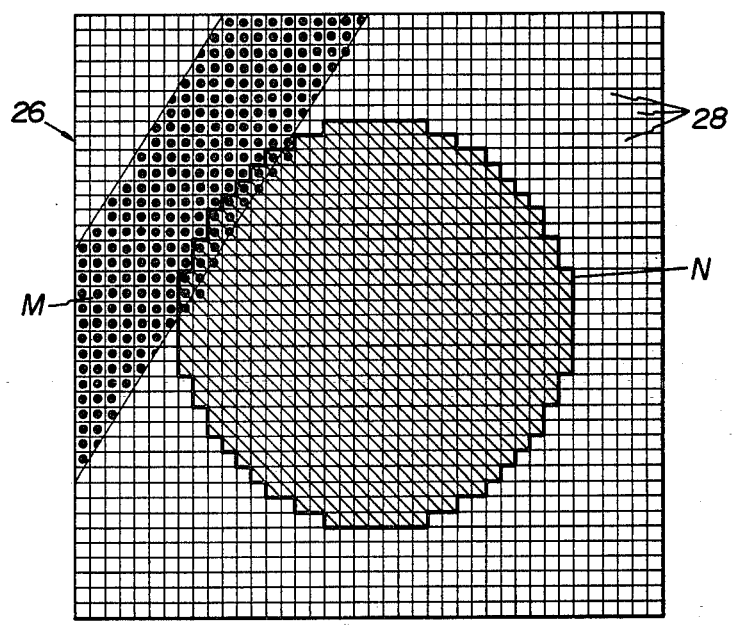
FIG. 3 is a plan view showing, to an enlarged scale, the area-configuration matrix array of photoelectric transducer elements forming part of the image sensing unit in the arrangement illustrated in FIG. 2.
Figure 4:
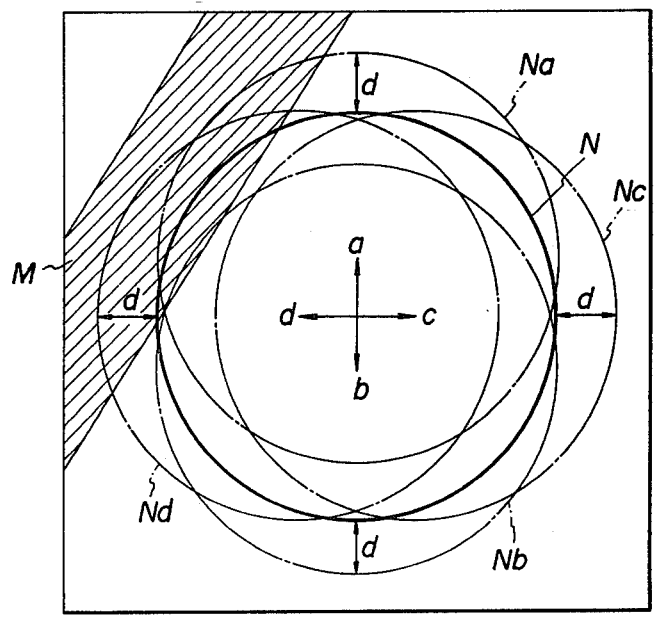
FIG. 4 is a diagram showing the principles on the basis of which the basic and modified reference areas used as reference indexes in the embodiment of FIG. 1 are to be formulated in regard to the detected image sensing zone representative of a portion of the pattern to be traced.

In FIG. 3, the photoelectric transducer elements 28 constructing the two-dimensional image sensing matrix array 26 are shown arranged in the form of 50×50 matrix. A total of 2,500 transducer elements 28 thus arranged are, by way of example, assumed to be mounted on a square-shaped silicon substrate measuring 1.8 cm in both length and breadth and respectively constituted by diffused p-n junction photodiodes. When each of the photoelectric transducer elements 28 is electrically energized in the presence of light falling on the transducer element, the transducer element 28 produces an electric output signal which is largely proportional in magnitude to the intensity of the light incident on the transducer element as is well known in the art. Each of the transducer elements 28 forms part of an electric network adapted to produce a binary signal depending upon the magnitude of the analog signal produced by the transducer element but is herein assumed for brevity of description to be operative to produce in itself a logic "1" output signal in response to the light reflected from a dark surface and a logic "0" output signal in response to the light reflected from a bright surface. It therefore follows that, when the image sensing matrix array 26 is positioned above a portion of the curvilinear pattern 12 on the front face of the drawing 10 and provided all the photoelectric transducer elements 28 of the matrix array 26 thus positioned are energized concurrently, each of the transducer elements 28 located above the portion of the curvilinear pattern 12 is actuated to produce a logic "1" output signal and each of the remaining transducer elements 28 of the matrix array 26 produces a logic "0" output signal. In FIG. 3, those transducer elements 28 which are located above the particular portion of the curvilinear pattern 12 and which are thus producing logic "1" output signals are indicated by sections each marked with a dot. The photoelectric transducer elements 28 represented by the dotted sections form a detected image sensing zone M responsive to the image of the above mentioned portion of the curvilinear pattern 12 on the drawing 10 as schematically indicated in FIG. 4.

Reverting to FIGS. 1 and 2, the X-axis shift register 30 is connected by a line 34 to a clock generator module 36 (shown in block form in FIG. 1) and is cyclically actuated by a series of clock pulses supplied at a predetermined frequency from the clock generator module 36. In response to each of the clock pulses thus supplied in succession from the clock generator module 36, the X-axis shift register 30 is actuated to sample each of the photoelectric transducer elements 28 of the row selected by the Y-axis shift register 32. The individual photoelectric transducer elements 28 of each row are thus sequentially scanned by the X-axis shift register 30 and produce logic "1" or "0" output signals as clock pulses are supplied successively from the clock generator module 36. The logic "1" or "0" output signals thus delivered from the image sensing matrix array 26 are successively supplied through a line 40 to an overlap area monitor circuit 42 the functions of which will be described later. Upon completion of the sampling of the photoelectric transducer elements 28 of each row, an end-of-scan signal is supplied from the X-axis shift register 30 to the Y-axis shift register 32 via a line 38 interconnecting the two shift registers 30 and 32 and actuates the Y-axis shift register 32 to select the next row of photoelectric transducer elements 28 for enabling the X-axis shift register 30 to sample the photoelectric transducer elements 28 of the row newly selected. When the last one of the photoelectric transducer elements 28 of the last row is accessed by the X-axis shift register 30, an end-of-frame signal is delivered from the Y-axis shift register 32 and is fed through a line 44 to the above mentioned overlap area monitor circuit 42 and further to a central processing unit (CPU) 46.

Referring again to FIG. 3 of the drawings, the generally circular, hatched area defined by thick, stepped boundary lines indicates a basic reference area which is representative of the area which is to be cut out in the workpiece 16 (FIG. 1) by the jet flame produced by the cutting torch 14 or each of the previously mentioned cutting torches carried by a common torch carrier when the cutting torch is held at rest above the workpiece. In the present invention, there is further introduced the concept and term of "modified reference area". A modified reference area herein referred to is defined as the area which is imaginarily obtained on the image sensing matrix array 26 when the above mentioned basic reference area No is moved a predetermined distance d from its original position on the matrix array 26 in one of four predetermined directions angled to each other on a common plane parallel with the plane on which the photoelectric transducer elements 28 are arranged. In the embodiment of the present invention, four modified reference areas Na, Nb, Nc and Nd are considered, which are to be obtained on the image sensing matrix array 26 when the basic reference area N is moved the predetermined distance d from its original position in first, second, third and fourth directions which are successively angled at 90 degrees to each other as indicated by a, b, c and d, respectively, in FIG. 4, viz., forwardly, rearwardly, rightwardly and leftwardly when viewed in FIG. 4. In FIG. 4, the amount of displacement of each of the modified reference areas Na to Nd from the basic reference area N is shown exagerated but is preferably such that is substantially equal to the measurement of each of the transducer elements 28.

The first to fourth modified reference areas Na, Nb, Nc and Nd are registered in a memory circuit 48 (FIG. 1) which is connected by an address bus 50 to a memory address signal generator 52 (FIG. 2) which constitutes memory readout means in the pattern tracing system according to the present invention and which may be incorporated into the image sensing unit 22. The memory address signal generator 52 in turn is connected by a bus 54 to the X-axis shift register 30 and by a bus 56 to the Y-axis shift register 32 as shown in FIG. 2. As the rows of the photoelectric transducer elements 28 are successively selected by the Y-axis shift register 32 and the individual photoelectric transducer elements 28 of the selected row are sampled by the X-axis shift register 30, a signal representative of the location in the selected row of the photoelectric transducer element 28 being sampled and a signal representative of the selected row of the photoelectric transducer elements 28 are fed from the X-axis and Y-axis shift registers 30 and 32 to the memory address signal generator 52 through the buses 54 and 56, respectively, and causes the signal generator 52 to produce an address signal respresentative of the coordinate location in the matrix array 26 of the particular photoelectric transducer element 28 being sampled by the X-axis shift register 30. A series of address signals are thus successively supplied from the addressing signal generator 52 to the memory circuit 48 through the memory bus 50 and actuate the memory circuit 48 to read out the above described first to fourth modified reference areas Na, Nb, Nc and Nd synchronously as the photoelectric transducer elements 28 of the image sensing matrix array 26 are sampled sequentially by the X-axis shift register 30. The memory circuit 48 has output terminals connected by lines 58 to the overlap area monitor circuit 42.

Figure 5:
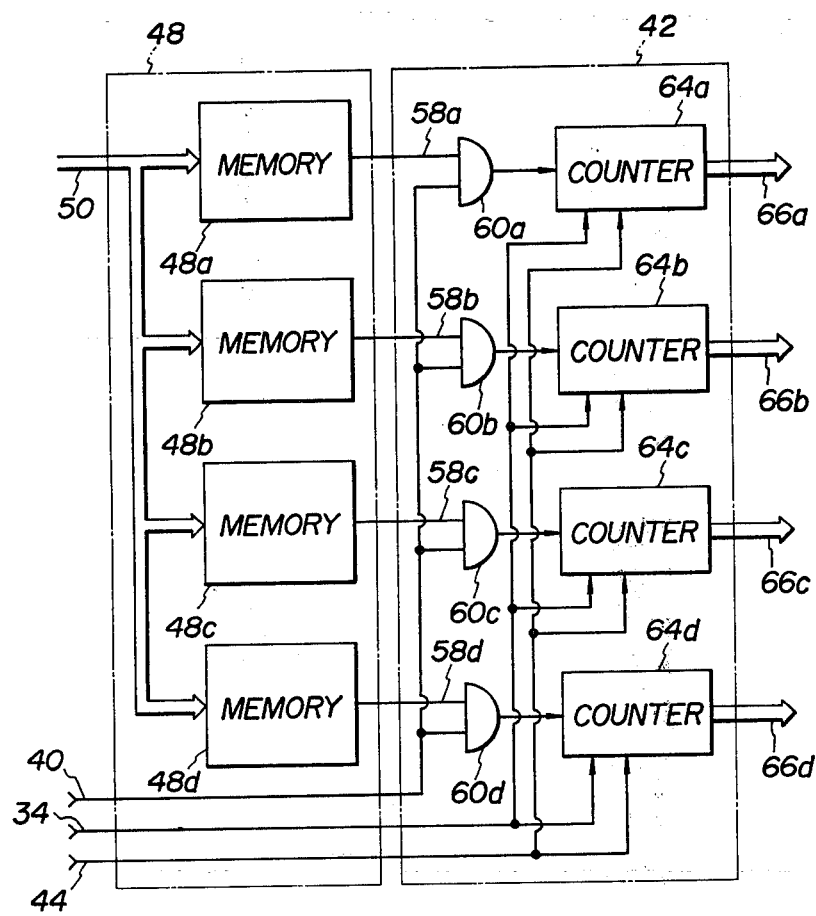
FIG. 5 is a block diagram showing preferred examples of the circuit arrangement of the memory and overlap area monitor circuits forming part of the embodiment illustrated in FIG. 1.

Referring to FIG. 5 of the drawings, the memory circuit 48 comprises four, first to fourth, memory units 48a, 48b, 48c and 48 d having input ports connected by the address bus 50 to the memory address signal generator 52 (FIG. 2). The first to fourth memory units 48a, 48b, 48c and 48d have registered therein the previously mentioned first to fourth modified reference areas Na, Nb, Nc and Nd, respectively, and are triggered concurrently each time an address signal is supplied from the memory address signal generator 52 through the address bus 50. Each of the memory units 48a, 48b, 48c and 48d consists of a number of memory cells respectively allocated to the individual photoelectric transducer elements 28 of the image sensing matrix array 26 and is adapted to produce a logic "1" or "0" output signal depending upon whether the transducer element 28 corresponding to the particular memory cell accessed by an address signal supplied to the memory unit falls within or outside the modified reference area registered in the memory unit. In the arrangement herein shown, it is assumed by way example that each of the memory units 48a, 48b, 48c and 48d is adapted to produce a logic "1" output signal when the transducer element 28 corresponding to the particular memory cell sampled by an address signal supplied to the memory unit falls within the modified reference area registered in the memory. If, therefore, the transducer element 28 corresponding to the memory cell sampled by an address signal supplied to, for example, the first memory unit 48a falls within the first modified reference area Na, the memory unit 48a produces a logic "1" output signal. If, conversely, the transducer element 28 corresponding to the memory cell accessed by the address signal supplied to the memory unit 48a happens to be outside the first modified reference area Na, then the memory unit 48a produces a logic "0" output signal. Each of the first to fourth memory units 48a to 48d is thus actuated to successively produce logic "1" and/or "0" output signals as address signals respectively representative of the coordinate locations of the photoelectric transducer elements 28 being sampled by the X-axis shift register 30 (FIG. 2) are fed to the memory unit. The output signals thus produced by the four memory units 48a to 48d are supplied through the lines 58 to the overlap area monitor circuit 42.

The overlap area monitor circuit 42 is adapted to monitor the area over which the detected image sensing zone M shown in FIG. 3 is overlapped by each of the first to fourth modified reference areas Na to Nd and comprises four, first to fourth, logic "AND" gate circuits 60a, 60b, 60c and 60d each having two, first and second, input terminals. The first input terminals of the logic "AND" gate circuits 60a to 60d are connected by lines 58a to 58d to the first to fourth memory units 48a to 48d, respectively. The respective second input terminals of the logic "AND" gate circuits 60a to 60d are connected jointly to the line 40 leading from the image sensing matrix array 26. Thus, each of the first to fourth logic "AND" gate circuits 60a to 60d is adapted to produce a logic "1" output signal in the presence of logic "1" signals at both of its first and second input terminals, viz., when the photoelectric transducer element 28 being sampled by the X-axis shift register 30 falls within the detected image sensing zone M and concurrently the transducer element 28 corresponding to the memory cell accessed by an address signal impressed on each of the memory units 48a and 48d falls within the modified reference area Na, Nb, Nc or Nd registered in the particular memory unit. The memory address signal generator 52 is arranged to produce address signals in synchronism with the individual scanning steps taken by the X-axis shift register 30 so that each of the above described logic "AND" gate circuits 60a to 60d is operative to produce a logic "1" output signal each time the photoelectric transducer element 28 corresponding to the memory cell sampled by an address signal supplied to the respectively associated one of the memory units 48a to 48d falls within both the detected image sensing zone M and the modified reference area Na, Nb, Nc or Nd registered in the particular memory unit.

Each of the memory units 48a to 48d constituting the memory circuit 48 is preferably of a programmable nature so that the modified reference area to be registered therein can be changed or adjusted depending upon the desired width of the cut to be made in the workpiece and/or the width of the pattern to be traced. Such a memory unit may be constituted by, for example, a programmable read only memory (PROM) or a random access memory (RAM). The memory units 48a to 48d are thus shown connected to the central processing unit 46 by a control bus 62 so that each of the memory units can be programmed or re-programmed from the central processing unit 46.

The overlap area monitor circuit 42 further comprises four, first to fourth, digital counter circuits 64a, 64b, 64c and 64d having input terminals connected to the output terminals of the first to fourth logic "AND" gate circuits 60a, 60b, 60c and 60d, respectively, and trigger terminals jointly connected to the clock generator module 36 (FIG. 1) through the line 34. The counter circuits 64a to 64d further have reset terminals jointly connected to the Y-axis shift register 32 through the end-of-frame signal line 44. Each of the counter circuits 64a to 64d is thus adapted to count the logic "1" output signals from the associated "AND" gate circuit 60a, 60b, 60c or 60d in synchronism with the clock pulses supplied to the counter circuit through the line 34. Upon completion of the readout of all the photoelectric transducer elements 28 of the image sensing matrix array 26 (FIGS. 2 and 3), the end-of-frame signal is supplied to each of the counter circuits 64a to 64d through the line 44 and causes each counter circuit to produce an output signal representative of the number of the counts registered therein. The counter circuits 64a to 64d are thereafter cleared and are made ready for operation in the subsequent scanning cycle. The respective output signals produced by the counter circuits 64a to 64d are fed to the central processing unit 46 through buses 66a to 66d (which are represented by a bus 66 in FIG. 1). As will be readily understood, each of the output signals thus delivered from the first to fourth counter circuits 64a to 64d to the central processing unit 46 is representative of the area over which the detected image sensing zone M and each of the first to fourth modified reference areas Na to Nd, respectively, overlap each other. The central processing unit 46 constitutes computing means in the pattern tracing system according to the present invention and is basically operative to select from among the signals respectively delivered from the first to fourth counter circuits 64a to 64d a signal representative of an overlap area satisfying predetermined conditions and to produce an output signal representative of the direction a, b, c or d (FIG. 4) allocated to the memory unit 48a, 48b, 48c or 48d from which the signals resulting in the signal selected by the central processing unit 46 are delivered.

Figure 6:
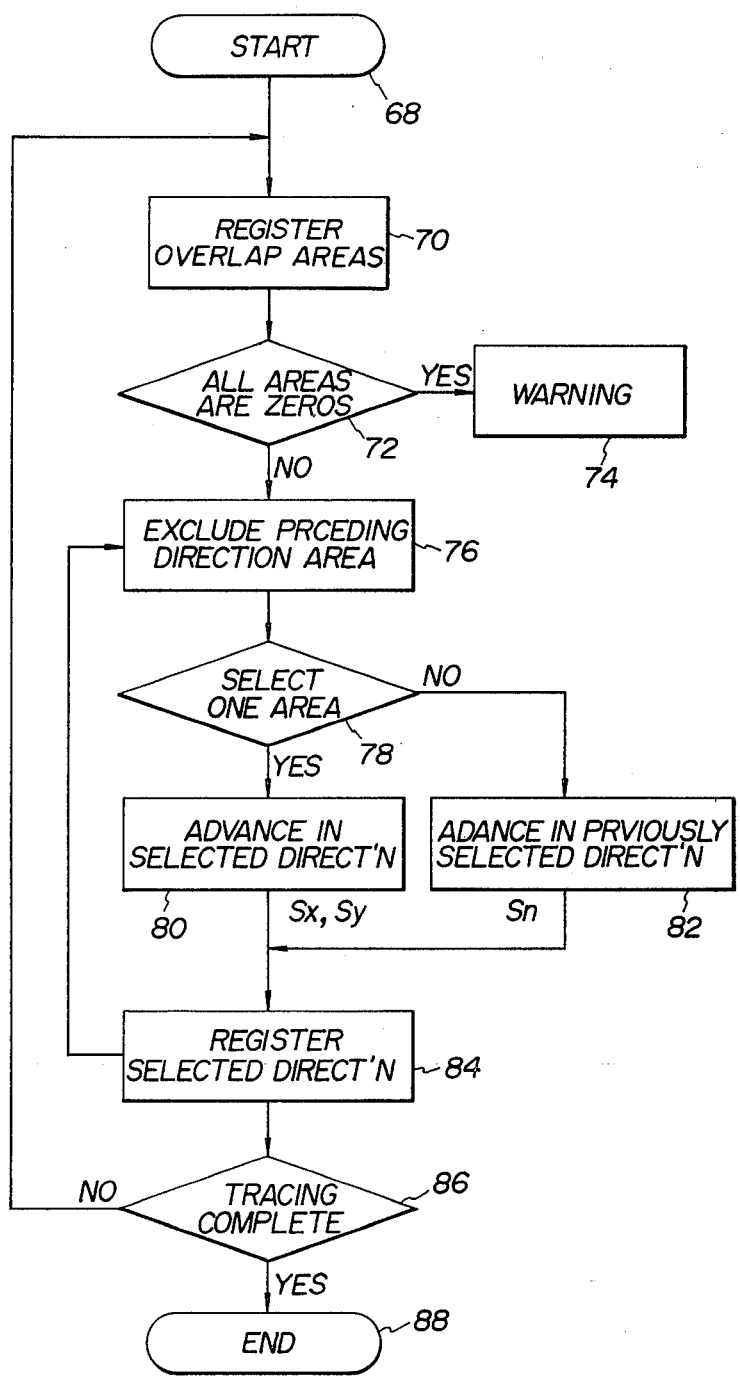
FIG. 6 is a flowchart representative of the various steps to be taken in the central processing unit in the embodiment of FIG. 1.

In response to the output signals delivered from the overlap area monitor circuit 42, the central processing unit 46 is caused to start operation as indicated at 68 in the flowchart of FIG. 6 and registers in a first step 70 the pieces of information representative of the four overlap areas over which the detected image sensing zone M is overlapped by the first to fourth modified reference areas Na to Nd. The step 70 is followed by a second step 72 to check whether or not all the overlap areas registered in the first step 70 are zeros. If, in this instance, the answers in the second step 72 are all in the affirmative "YES", viz., all the modified reference areas Na, Nb, Nc and Nd are located outside the detected image sensing zone M, a signal is produced in a third step 74 for interrupting the movement of the photoelectric sensing unit 22 (FIG. 1) and adjusting the position of the sensing unit 22 with respect to the pattern 12 on the drawing 10 by, for example, human intervention.

If, however, at least one of the answers taken in the second step 72 is in the negative "NO", viz., at least one of the overlap areas over which the detected image sensing zone M is overlapped by the first to fourth modified reference areas Na to Nd is not zero, then the pieces of information registered in the first step 70 are processed in a fourth step 76 wherein the direction a, b, c or d (FIG. 4) in which the photoelectric image sensing unit 22 (FIG. 1) was moved during the immediately preceding cycle of operation is registered. In the fourth step 76, the pieces of information representative of the four overlap areas are processed to determine and exclude the overlap area formed by the modified reference area Na, Nb, Nc or Nd which corresponds to the direction a, b, c or d registered in the step 76. The pieces of information representative of the remaining three overlap areas are further processed in a fifth step 78 so as to determine whether or not one and only one of the three overlap areas is closer to a predetermined value than the other two. If the answer in the fifth step 78 is in the affirmative "YES", viz., only one of the selected three overlap areas is closer to the predetermined value than the other two of the three overlap areas, a control signal Sx or Sy representative of the direction in which the photoelectric sensing unit 22 is to be moved over the drawing 10 (FIG. 1) is produced in a sixth step 80. If, however, the answer taken in the fifth step 78 is in the negative "NO", viz., the three overlap areas selected in the fourth step 76 are equal to each other or two of the selected three overlap areas are equal to each other and are closer to the predetermined value than the remaining one of the three overlap areas, a control signal Sn is produced in a seventh step 82, calling for movement of the photoelectric sensing unit 22 in the same direction as the direction in which the sensing unit 22 was caused to move during the immediately preceding cycle of operation. The control signal Sx or Sy produced in the sixth step 80 or the control signal Sn produced in the seventh step 82 is registered in an eighth step 84 and through the eighth step 84 further registered in the fourth step 76. The eighth step 84 is followed by a ninth step 86 in which it is confirmed whether or not the tracing operation for the drawing 10 (FIG. 1) is complete. If the answer in the ninth step 86 is in the affirmative "YES", an end-of-program signal appears in a tenth step 88. If, however, the answer in the ninth step 86 is in the negative "NO", viz., the tracing operation is still to go on, the central processing unit 46 is kept ready to register in the first step 70 new pieces of information to be produced in the subsequent cycle of operation.

The control signal Sx or Sn or the control signal Sy or Sn produced in the sixth or seventh step 80 or 82 in the central processing unit 46 is fed through a line 90 or a line 90' to an X-axis drive unit 92 or a Y-axis drive unit 92', respectively, which is drivingly connected to the photoelectric sensing unit 22 as shown schematically in FIG. 1. In response to the control signal Sx, Sy or Sn, the X-axis drive unit 92 or the Y-axis drive unit 92' is actuated to drive the photoelectric sensing unit 22 to move a predetermined unit distance in a direction indicated by arrow x in FIG. 1, viz., rightwardly or leftwardly over the front face of the drawing 10 or in a direction indicated by arrow y in FIG. 1, viz., forwardly or rearwardly depending upon the polarity of the control signal Sx, Sy or Sn supplied to the drive unit 92 or 92'. The above mentioned predetermined unit distance over which the photoelectric sensing unit 22 is to be moved each time the drive unit 92 or 92' is actuated is preferably the previously mentioned predetermined distance d which each of the modified reference areas Na to Nd is displaced from the basic reference area N in the matrix array 26 illustrated in FIGS. 3 and 4. Each of the X-axis and Y-axis drive units 92 and 92' may be constituted by a pulsed stepping motor. The predetermined value with which the three overlap areas selected in the fourth step 76 are to be compared in the fifth step 78 may be selected so that the overlap area selected in the fifth step 78 has an arc portion located on or in proximity to the center line of the detected image sensing zone M shown in FIGS. 3 and 4.

A second preferred embodiment of the photoelectric pattern tracing system according to the present invention will be hereinafter described with reference to FIGS. 7 to 9 of the drawings.

While the photoelectric image sensing unit 22 of the embodiment of the tracing system hereinbefore described uses the two-dimensional or area-configuration image sensing matrix array 26, the photoelectric image sensing unit incorporated in the second embodiment of the present invention comprises a linear-configuration rotary photoelectric matrix array 94 having a suitable number of photoelectric transducer elements 96 arranged linearly on a common elongated substrate. The photoelectric matrix array 94 is rotatable about one end thereof on a plane parallel with the front face of a drawing (not shown) carrying a dark, uniplanar pattern on the front face. The photoelectric transducer elements 96 constituting the matrix array 94 are herein assumed to be 32 in number by way of example and are denoted by $D_1$, $D_2$, $D_3$, ... $D_{32}$ from the axis of rotation of the matrix array 94 to the outermost end of the array 96 as indicated in FIG. 7. Each of the photoelectric transducer elements 96 is preferably constructed by a diffused p-n junction photodiode similarly to the photoelectric transducer elements 28 constituting the image sensing matrix array 26 in the first embodiment of the present invention.

The length of the linear-configuration matrix array 94, viz., the radius of rotation of the matrix array 94 about its innermost end is assumed to be substantially equal to the radius of the previously mentioned basic reference area N in the area-configuration photoelectric matrix array 26 shown in FIG. 3. When, thus, the matrix array 94 turns about the innermost end thereof, the matrix array 94 describes a circular scanning area as indicated by S in FIG. 7. If, therefore, the matrix array 94 is rotated about its innermost end on a plane parallel with the front face of the drawing, those photoelectric transducer elements 96 which travel in proximity to a portion of the pattern on the front face of the drawing will produce a logic "1" output signal in response to the light reflected from the particular portion of the pattern and thereby form a detected image sensing zone M' within the circular scanning area S as indicated by a hatched area in FIG. 7. It will be apparent that the detected image sensing zone M' thus formed by the linear-configuration matrix array 94 corresponds to the previously mentioned detected image sensing zone M formed by the area-configuration photoelectric matrix array 26 shown in FIGS. 3 and 4.

Figure 7:
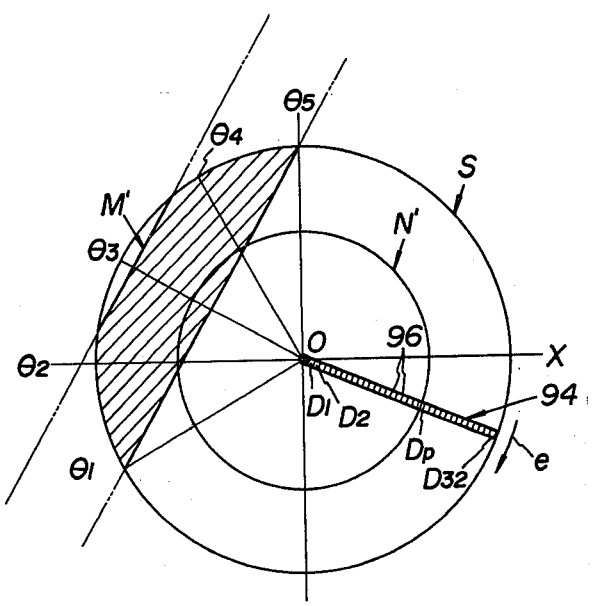
FIG. 7 is a schematic view showing the arrangement in which another preferred embodiment of the present invention is to operate.
Figure 8:
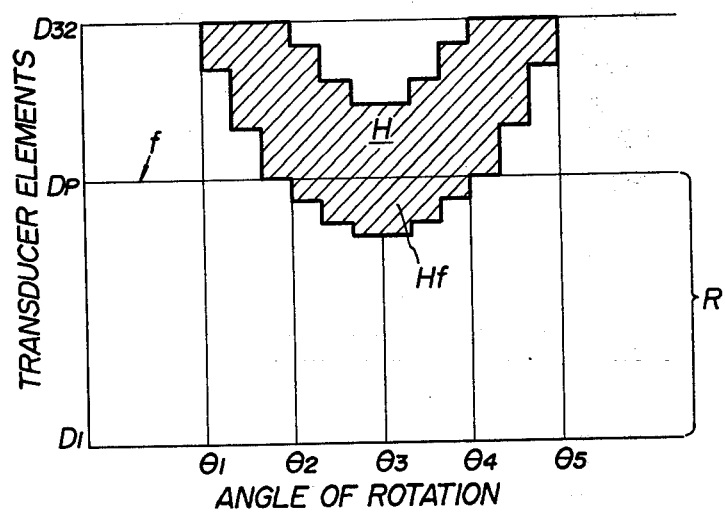
FIG. 8 is a graphic representation of the detected image sensing zone formed by a linear-configuration rotary matrix array in the arrangement illustrated in FIG. 7.

If, thus, the linear-configuration matrix array 94 is rotated about its innermost end in a direction indicated by arrow e in FIG. 7 and if the photoelectric transducer elements 96 constituting the matrix array 94 are sampled at each of time intervals respectively corresponding to predetermined angular intervals of, for example, 10 degrees about the axis of rotation of the matrix array 94, the matrix array will produce logic "1" output signals with a characteristic represented by a hatched area H in the graph of FIG. 8. In FIG. 8, $\theta_1$, $\theta_2$, ... $\theta_5$ represent the angles of rotation at certain angular intervals from a certain angle $\theta_1$ at which the matrix array 94 rotated from a predetermined initial line OX in polar coordinates having an origin O at the axis of rotation of the matrix array 94 first responds to the pattern on the front face of the drawing and commences formation of the detected image sensing zone M' as shown in FIG. 7. Thus, the hatched area H shown in FIG. 8 is representative of the detected image sensing zone M' shown in FIG. 7 and will therefore be hereinafter referred to also as detected image sensing zone.

If a circle having a radius smaller than the radius of the circular scanning area S is described about the origin O in the polar coordinates illustrated in FIG. 7, an area N' equivalent to the previously mentioned basic reference area N can be obtained within the scanning area S. If, in this instance, the radius of the basic reference area N' thus formed is selected to be equal to the distance between the respective center points of the first transducer element $D_1$ and the p-th transducer element $D_p$ of the matrix array 94, the above mentioned basic reference areas N' is represented by the area R lower than line f in the graph of FIG. 8. It therefore follows that the area over which the basic reference area N' shown in FIG. 7 is overlapped by the detected image sensing zone M' is represented by that portion Hf of the detected image sensing zone H which is lower than the line f in the graph of FIG. 8. Thus, the overlap area between the basic reference area N' and the detected image sensing zone M' shown in FIG. 7 is represented by the portion Hf of the detected image sensing zone H in the graph of FIG. 8 and can accordingly be digitally detected by counting the number of the logic "1" signals represented by the particular portion Hf, viz., the number of the logic "1" output signals produced by the first to p-th photoelectric transducer elements $D_1$ to $D_p$ of the matrix array 94.

If, on the other hand, the basic reference area N' as above defined is displaced a predetermined distance from its original position in four predetermined directions which are successively angled at 90 degrees to each other, viz., forwardly, rearwardly, rightwardly and leftwardly in FIG. 7, the resulting four areas are respectively equivalent to the previously mentioned modified reference areas Na, Nb, Nc and Nd. When a graphic representation similar to that of FIG. 8 is used, each of the modified reference areas thus resulting from the basic reference area N' shown in FIG. 7 can be represented by an area obtained by adding an incremental step or a decremental step to the basic reference area R along the line f in respect of predetermined ranges of angle of rotation of the matrix array 94 from the initial line OX (FIG. 7) depending upon the direction in which the modified reference area is displaced from the basic reference area N'. In this instance, each of the areas over which the detected image sensing zone M' is overlapped by the individual modified reference areas resulting from the basic reference area N' can be represented by the number of the logic "1" signals obtained by adding or subtracting a predetermined number to or from the number of the logic "1" signals represented by the portion Hf of the detected image sensing zone H shown in FIG. 8 in respect of predetermined ranges of angle of rotation of the matrix array 94 depending upon the direction in which the modified reference area is displaced from the basic reference area N' shown in FIG. 7.

Figure 9:
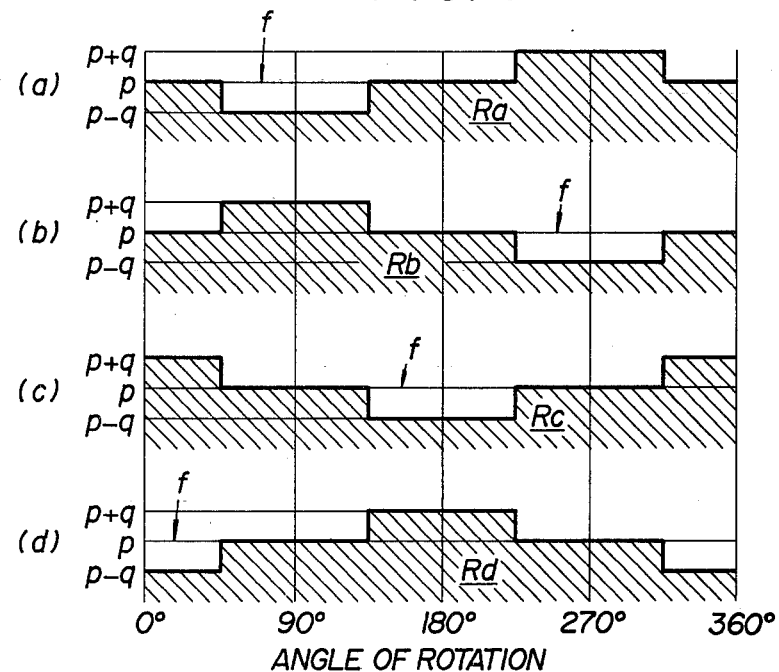
FIG. 9 is a graphic representation of the modified reference areas to be registered in the embodiment of FIG. 7.

FIG. 9 shows examples of the programs in accordance with which the four modified versions of the basic reference area R illustrated in FIG. 8 are to be obtained on the basis of the above described principle. In FIG. 9, the modified reference areas area R in the graphic representation of FIG. 8 are denoted by Ra, Rb, Rc and Rd in graphs (a), (b), (c) and (d), respectively. The modified reference areas Ra, Rb, Rc and Rd are assumed to correspond to the first, second, third and fourth modified reference areas Na, Nb, Nc and Nd, respectively, shown in FIG. 4 and are thus obtained when the basic reference area N' shown in FIG. 7 is displaced forwardly, rearwardly, rightwardly and leftwardly in FIG. 7. Thus, the modified reference area Ra obtained when the basic reference area N' is displaced forwardly in FIG. 7 is represented by an area formed by subtracting a predetermined number q from the number p of the logic "1" signals produced at each of the predetermined angular intervals of 10 degrees in the vicinity of 90 degrees from the initial OX (FIG. 7) and adding the predetermined number q to the number p of the logic "1" signals produced at each of the predetermined angular intervals of 10 degrees in the vicinity of 270 degrees from the initial line OX, as indicated in graph (a). Likewise, the modified reference area Rb resulting from the displacement of the basic reference area N' in the rearward direction in FIG. 7 is represented by an area obtained by adding the predetermined number q to the number p of the logic "1" signals produced at each of the predetermined angular intervals of 10 degrees in the vicinity of 90 degrees from the initial line OX and subtracting the predetermined number q from the number p of the logic "1" signals produced at each of the predetermined angular intervals of 10 degrees in the vicinity of 270 degrees from the initial line OX, as indicated in graph (b). On the other hand, the modified reference area Rc resulting from the displacement of the basic reference area N' in the rightward direction in FIG. 7 is represented by an area which is obtained by adding the predetermined number q to the number p of the logic "1" signals produced at each of the predetermined angular intervals of 10 degrees in the vicinity of the initial line OX and subtracting the predetermined number q from the number p of the logic "1" output signals produced at each of the predetermined angular intervals of 10 degrees in the vicinity of 180 degrees from the initial line OX, as indicated in graph (c). Conversely, the modified reference area Rd resulting from the displacement of the basic reference area N' in the leftward direction in FIG. 7 is represented by an area obtained by subtracting the predetermined number q from the number p of the logic "1" signals produced at each of the predetermined angular intervals of 10 degrees in the vicinity of the initial line OX and adding the predetermined number q to the number p of the logic "1" signals produced at each of the predetermined angular intervals of 10 degrees in the vicinity of 180 degrees from the initial line OX. Each of the angular ranges over which the number p of the logic "1" signals produced at each of the predetermined angular intervals is to be increased or decreased by the predetermined number q in the above described fashion is assumed, by way of example, to be 90 degrees across each of 0, 90, 180 and 270 degrees from the initial line OX.

The four modified reference areas Ra, Rb, Rc and Rd thus formulated graphically are respectively registered in four different memory units (not shown) in terms of the denotations respectively allocated to the individual photoelectric transducer elements 96 of the matrix array 94 and the individual angular intervals of the rotation of the matrix array 94 from the initial line OX shown in FIG. 7. Each of such memory units may comprise a predetermined number of memory cells respectively allocated to all the possible combinations of the above mentioned angular intervals and the respective denotations of the transducer elements 94 and may be electrically connected to memory readout means operative to deliver address signals to the memory cells allocated to each of the angular intervals at each of the aforesaid time intervals. The memory units to be used for this purpose are essentially similar in effect to the memory units 48a, 48b, 48c and 48d constituting the memory circuit 48 shown in FIG. 5 and, for this reason, may be assumed to be constituted by these memory units 48a, 48b, 48c and 48d, respectively.

Figure 10:
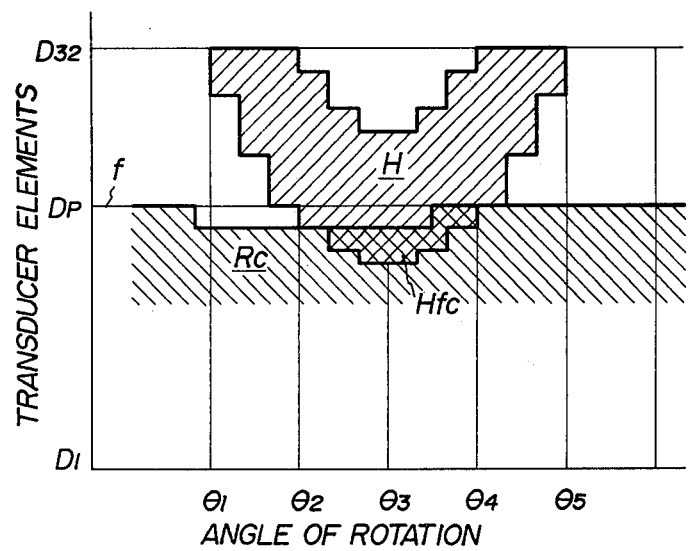
FIG. 10 is a graphic representation of the area over which the detected image sensing zone indicated in FIG. 8 is overlapped by one of the modified reference areas shown in FIG. 9.

As the linear-configuration matrix array 94 is rotated about the axis of rotation O thereof, the memory cells constituting each of the memory units 48a to 48d are sequentially sampled by suitable address signals which are produced in synchronism with the individual angular intervals of 10 degrees of rotation of the matrix array 94. Each of the memory units 48a to 48d is thus caused to produce a logic "1" output signal when the memory cell sampled by such an address signal falls within the modified reference area Ra, Rb, Rc or Rd registered in the particular memory unit. The logic "1" output signals thus delivered from the individual memory units 48a to 48d are fed to two-input logic "AND" gate circuits forming part of an overlap area monitor circuit similar in effect to the overlap area monitor circuit 42 shown in FIG. 5. When incorporated into the embodiment using the linear-configuration matrix array 94, the overlap area monitor circuit 42 is arranged so that one input terminal of each of the logic "AND" gate circuits 60a to 60d is connected to the respectively associated one of the memory units 48a to 48d and the other input terminals of the "AND" gate circuits 60a to 60d are jointly connected to the individual photoelectric transducer elements 96 (FIG. 7) of the matrix array 94. When, thus, the matrix array 94 is moving over a portion of the pattern on the drawing, each of the logic "AND" gate circuits 60a to 60d is supplied with a series of logic "1" signals from those transducer elements 96 of the matrix array 94 which fall within the detected image sensing zone M' shown in FIG. 7. Each of the logic "AND" gate circuits 60a to 60d is therefore operative to produce a logic "1" output signal each time the memory cell sampled in the respectively associated one of the memory units 48a to 48d falls within the modified reference area Ra, Rb, Rc or Rd registered in the memory unit and in addition the photoelectric transducer element 96 corresponding to the particular memory cell falls within the detected image sensing zone M' shown in FIG. 7. The logic "1" output signals thus produced by the logic "AND" gate circuits 60a to 60d are supplied to digital counter circuits similar in effect to the counter circuits 64a to 64d of the overlap area monitor circuit 42 shown in FIG. 5. Each of the counter circuits 64a to 64d is clocked in synchronism with the clock frequency at which the transducer elements 96 of the matrix array 94 are sequentially clocked and is thus operative to count the logic "1" output signals from the associated "AND" gate circuit 60a, 60b, 60c or 60d as the transducer elements 96 are clocked and the memory cells in the associated memory unit 48a, 48b, 48c or 48d are sampled. At the end of the full turn of the matrix array 94 about the axis of rotation O thereof, an end-of-frame signal is supplied to each of the counter circuits 64a to 64d and causes each counter circuit to produce an output signal representative of the number of the logic "1" signals counted by the counter circuit. The respective output signals produced by the counter circuits 64a to 64b are supplied to a suitable central processing unit (not shown) which may be preferably constructed and arranged in such a manner as to conduct the steps represented by the flowchart of FIG. 6. It will be apparent that each of the output signals thus delivered from the counter circuits 64a to 64d in the above described fashion is representative of the area over which the hatched area H shown in FIG. 8 and representative of the detected image sensing zone M' shown in FIG. 7 is overlapped by each of the modified reference areas Ra, Rb, Rc and Rd shown in the graphs (a), (b), (c) and (d), respectively, of FIG. 9. In FIG. 10, the overlap area between the detected image sensing zone H and the modified reference area Rc resulting from the displacement of the basic reference area N' (FIG. 7) is displaced in the rightward direction is indicated by a cross-hatched area Hfc. In the graph of FIG. 10, the angles $\theta_1$, $\theta_2$, $\theta_3$, $\theta_4$ and $\theta_5$ are assumed to be 150°, 180°, 210°, 240° and 270°, respectively, from the initial line OX in FIG. 7.

The numbers p and q to determine the modified reference areas Ra to Rd to be registered in the memory units 48a to 48d, respectively, can be varied from the central processing unit depending upon the desired width of the cut to be made and/or the width of the pattern to be traced.

While it has been assumed that each of the described embodiment of the system according to the present invention is used in combination with an oxyacetylene cutting torch, the pattern tracing system herein proposed is compatible with a cutting machine using any other cutting tool such as a rotary blade or may be incorporated into any of machines and equipment in which the tracing of a given pattern is required. Furthermore, the pattern to be traced by the system according to the present invention is not limited to a line drawn on a sheet of paper but may be any geometrical or graphic pattern drawn or otherwise occurring on a uniplanar surface of any material insofar as the pattern is monochromatically contrastive to the environment on the pattern-carrying surface of the material.

While, furthermore, the image sensing unit of each of the embodiments hereinbefore described has been assumed to be responsive to the light reflected from the front face of a drawing, it will be apparent that the system according to the present invention may be used in such a manner that the image sensing unit is responsive to the light passed through the material carrying the pattern to be traced, provided the pattern-carrying material is transparent or translucent. The material carrying the pattern to be traced by the light reflected from or passed through the material may be positioned on any plane angled with respect to a horizontal plane if the image sensing unit is arranged to be movable on a plane parallel with the plane on which the pattern-carrying material is placed.

If the material carrying the pattern to be traced is placed on a movable table, the system according to the present invention may be arranged so that the image sensing unit is held stationary and the movable table carrying the pattern-carrying material thereon is driven to move with respect to the image sensing unit in response to the signals supplied from the central processing unit forming part of the tracing system.

While, furthermore, it has been described that the signals to dictate the directions in which the image sensing unit is to be moved are produced on the basis of the four modified reference areas formed in four different directions perpendicularly intersecting each other, such signals may be produced on the basis of the modified reference areas formed in more than four different directions equiangularly intersecting each other so as to achieve higher accuracy in duplicating the pattern to be traced.

Only two preferred embodiments of the pattern tracing system according to the present invention have been described hereinbefore but it will be apparent that such embodiments are merely illustrative of the essential gist of the present invention and are subject to modification and chage if desired.

What is claimed is:

1. A method of tracing a monochromatically contrasting pattern on a uniplanar surface, comprising photoelectrically scanning at least a portion of the pattern on said uniplanar surface for producing signals forming on a plane substantially parallel with said uniplanar surface a detected image sensing zone substantially similar in configuration to said portion of the pattern on said uniplanar surface, registering pieces of information representative of a predetermined number of modified reference areas each displaced a predetermined distance in a predetermined direction from a prescribed basic area on said plane, sampling said pieces of information for delivering signals representative of each of the individual modified reference areas, producing in responsive to the signals representative of said detected image sensing zone and the signals representative of each of said modified reference areas a signal representative of the overlap area over which the detected image sensing zone is overlapped by each of the modified reference area, selecting from among the individual signals respectively representative of the overlap areas between said detected image sensing zone and said modified reference areas a signal representative of an overlap area satisfying predetermined conditions, producing a control signal representative of the predetermined direction allocated to the modified reference area corresponding to the signal selected, and photoelectrically scanning another portion of the pattern on said uniplanar surface depending upon said control signal.

2. A method as set forth in claim 1, in which said pattern on said uniplanar surface is scanned by the use of an area-configuration matrix array movable on said plane and comprising a predetermined number of rows each consisting of a predetermined number of photoelectric transducer elements arranged linearly, said pattern being scanned by selecting said rows in a predetermined sequence and sequentially sampling the individual transducer elements of the selected row at a predetermined frequency, said matrix array being moved in the direction represented by said control signal.

3. A method as set forth in claim 2, in which the pieces of information representative of each of said modified reference areas are stored in a memory unit comprising a predetermined number of memory cells respectively allocated to said transducer elements of said matrix array, said memory cells being sequentially sampled at a frequency substantially synchronized with said predetermined frequency for producing said signals representative of said modified reference areas.

4. A method as set forth in claim 1, in which said pattern on said uniplanar surface is scanned by the use of a linear-configuration matrix array which is rotatable about an axis substantially normal to said plane and which comprises a predetermined number of photoelectric transducer elements arranged linearly between the innermost and outermost ends of the matrix array and having respective denotations in terms of their respective distances from said axis, said photoelectric transducer elements being sampled at each of predetermined angular intervals about the axis of rotation of the matrix array.

5. A method as set forth in claim 4, in which the pieces of information representative of each of said modified reference areas are stored in a memory unit comprising memory cells respectively allocated to all the possible combinations of said angular intervals and the respective denotations of said transducer elements, said memory cells being sampled at each of time intervals respectively corresponding to said predetermined angular intervals, said matrix array being moved in the direction respresented by said control signal.

6. A method as set forth in claim 2 or 3, in which said matrix array is movable in substantially perpendicularly crossing four different directions on said plane and in which the predetermined directions in which said modified reference areas are respectively displaced from said basic reference area correspond to said four different directions, respectively.

7. A method as set forth in claim 4 or 5, in which the axis of rotation of said matrix array is movable in substantially perpendicularly crossing four different directions on said plane and in which the predetermined directions in which said modified reference areas are respectively displaced from said basic reference area correspond to said four different directions, respectively.

8. A method as set forth in any one of claims 1 to 5, in which the signal representative of each of said overlap areas is produced by producing a predetermined binary signal in the presence of both of the signal falling within said detected image sensing zone and the signal falling within each of said modified reference areas and counting the resultant binary signals.

9. A method as set forth in any one of claims 1 to 5, in which the signal representative of the overlap area satisfying said predetermined conditions is selected by a process comprising a first step of registering the signals respectively representative of said overlap areas, a second step of determining whether or not all the overlap areas respectively represented by the signals registered in the first step are zeros, a third step of producing a signal if the answer in the second step is in the affirmative, a fourth step of excluding from the signals registered in the first step a signal representative of the overlap area corresponding to the modified reference area displaced from said basic reference area in a direction corresponding to the direction represented by the control signal produced in an immediately preceding cycle of operation if the answer in the second step is in the negative, a fifth step of determining whether or not only one of the overlap areas respectively represented by the signals remaining in said fourth step is closer to a predetermined value than the overlap areas respectively represented by the others of the remaining signals, a sixth step of producing as the first named control signal a signal representative of the predetermined direction in which the modified reference area corresponding to said only one of the overlap areas if the answer in the fifth step is in the affirmative, a seventh step of producing as the first named control signal a signal representative of the direction represented by the control signal produced in the immediately preceding cycle of operation if the answer in the fifth step is in the negative, and an eighth step of registering the signal produced in the sixth or seventh step.

10. A photoelectric pattern tracing system for tracing a monochromatically contrasting pattern on a uniplanar surface, comprising
an image sensing unit which is movable on a plane substantially parallel with said uniplanar surface and which is photoelectrically responsive to the pattern on the uniplanar surface,
a predetermined number of memory units each having stored therein pieces of information representative of a modified reference area displaced a predetermined distance in a predetermined direction from a prescribed basic reference area on said plane,
image readout means operative to electrically scan said image sensing unit for causing the image sensing unit to deliver signals in response to at least a portion of said pattern, said signals forming on said plane a detected image sensing zone substantially similar in configuration to said portion of said pattern,
memory readout means operative to sample the pieces of information stored in each of said memory units for causing the individual memory units to deliver signals representative of the modified reference areas respectively allocated to the memory units,
an overlap area monitor circuit responsive to the signals delivered from said image sensing unit and said memory units and operative to produce a signal representative of the overlap area over which the basic reference area represented by the signals delivered from the image sensing unit is overlapped by the modified reference area represented by the signals delivered from each of said memory units,
computing means responsive to the signals from said overlap area monitor circuit and operative to select from among the signals produced by the overlap area monitor circuit a signal representative of an overlap area satisfying predetermined conditions and to produce an output signal representative of the predetermined direction allocated to the memory unit from which the signals resulting in the signal selected by the computing means are delivered, and
drive means responsive to the output signal from the computing means and operative to drive said image sensing unit to move a predetermined distance on said plane in the direction represented by the output signal from the computing means.

11. A photoelectric pattern tracing system as set forth in claim 10, in which said image sensing unit comprises an area-configuration matrix array comprising a predetermined number of rows each consisting of a predetermined number of photoelectric transducer elements arranged linearly and in which said image readout means is electrically connected to the transducer elements of all the rows and is operative to select the rows in a predetermined sequence and to sequentially sample the individual transducer elements of the selected row at a predetermined frequency.

12. A photoelectric pattern tracing system as set forth in claim 11, in which each of said memory units comprises a predetermined number of memory cells respectively allocated to the transducer elements of said image sensing unit and in which said memory readout means is electrically connected between said image readout means and each of said memory units and is operative to deliver a succession of address signals to said memory cells, respectively, of each of the memory units at a frequency substantially synchronized with said predetermined frequency.

13. A photoelectric pattern tracing system as set forth in claim 10, in which said image sensing unit comprises a linear-configuration rotary matrix array which is rotatable about an axis substantially normal to said plane and which comprises a predetermined number of photoelectric transducer elements arranged linearly between the innermost and outermost end of the matrix array and having respective denotations in terms of their respective distances from said axis, said image readout means being electrically connected to said transducer elements and being operative to sample the individual transducer elements at each of predetermined angular intervals about said axis.

14. A photoelectric pattern tracing system as set forth in claim 13, in which each of said memory units comprises a predetermined number of memory cells respectively allocated to all the possible combinations of said angular intervals and the respective denotations of said transducer elements and in which said memory readout means is electrically connected between said image readout means and each of said memory units and is operative to deliver address signals to the memory cells allocated to each of said angular intervals at each of said time intervals.

15. A photoelectric pattern tracing system as set forth in any one of claims 10 to 12, in which said image sensing unit is movable in substantially perpendicularly crossing four different directions on said plane and in which the predetermined directions in which said modified reference areas are resprectively displaced from said basic reference area correspond to said four different direction, respectively.

16. A combination of a photoelectric pattern tracing system as set forth in claim 15 and a machine tool including at least one machining member mechanically connected to and movable with said image sensing unit.

17. A photoelectric pattern tracing system as set forth in claim 13 or 14, in which the axis of rotation of said matrix array is movable in substantially perpendiculary crossing four different directions on said plane and in which the predetermined directions in which said modified reference areas are respectively displaced from said basic reference area correspond to said four different directions, respectively.

18. A photoelectric pattern tracing system as set forth in any one of claims 10 to 14, in which said overlap area monitor circuit comprises logic gate circuits electrically connected jointly to said image sensing unit and respectively to said memory units and each operative to produce a predetermined binary signal in the presence of both of the signal delivered from the image sensing unit and the signal delivered form the respectively associated one of the memory units, and resettable counter circuits respectively connected to said logic gate circuits and each operative to count the binary signals delivered from the respectively associated one of the logic gate circuits, said counter circuits being jointly connected to said image readout means for being reset each time all the transducer elements of the image sensing unit are sampled.

19. A combination of a photoelectric pattern tracing system as set forth in claim 18 and a machine tool including at least one machine tool mechanically connected to and movable with said image sensing unit.

20. A photoelectric pattern tracing system as set forth in any one of claims 10 to 14, in which said computing means comprises first means for registering the signals delivered from said overlap area monitor circuit and respectively representative of the overlap areas over which said detected image sensing unit is overlapped by the modified reference areas respectively allocated to said memory units, second means for determining whether or not all the overlap areas respectively represented by the signals registered in said first means are zeros, third means responsive to the positive answer in the second means, fourth means responsive to the negative answer in the second means and operative to exclude from the signals registered in said first means the signal representative of the overlap area over which said detected image sensing zone is overlapped by the modified reference area displaced from said basic reference area in the direction corresponding to the direction in which said image sensing unit is moved in an immediately preceding cycle of operation, fifth means for determining whether or not only one of the overlap areas respectively represented by the signals remaining in said fourth means is closer to a predetermined value than the overlap areas respectively represented by the others of the remaining signals, sixth means responsive to the affirmative answer in the fifth means for producing a signal representative of the predetermined direction allocated to the memory unit from which the signals resulting in the signal representative of said only one of the overlap areas are delivered, seventh means responsive to the negative answer in said fifth means for producing a signal representative of the direction in which said image sensing unit is moved in said immediately preceding cycle of operation, the signal delivered from either of said sixth and seventh means being fed to said drive means, and eighth means for registering therein and in said fourth means the signal delivered from the sixth or seventh means.

21. A combination of a photoelectric pattern tracing system as set forth in claim 20 and a machine tool including at least one machining member mechanically connected to and movable with said image sensing unit.

22. A combination of a photoelectric pattern tracing system as set forth in any one of claims 10 to 14 and a machine tool including at least one machining member mechanically connected to and movable with said image sensing unit.

23. A combination as set forth in claim 22, in which said machining member is constituted by an oxyacetylene cutting torch.

24. A combination as set forth in claim 22, in which said machining member is constituted by a rotary cutting blade rotatable about an axis movable with said image sensing unit.

* * * * *